United States Patent [19]

Stralka

[11] Patent Number: 5,265,814
[45] Date of Patent: Nov. 30, 1993

[54] WINDING DEVICE FOR MULTIPLE-WIRE WRAPPING AN OBJECT

[75] Inventor: Herbert Stralka, Bad Neustadt, Fed. Rep. of Germany

[73] Assignee: Siemens Aktiengesellschaft, Munich, Fed. Rep. of Germany

[21] Appl. No.: 938,951

[22] Filed: Sep. 1, 1992

Related U.S. Application Data

[63] Continuation-in-part of Ser. No. 790,261, Nov. 8, 1991, abandoned.

[30] Foreign Application Priority Data

Nov. 30, 1990 [DE] Fed. Rep. of Germany ....... 4038261

[51] Int. Cl.⁵ ............................................ B65H 54/64
[52] U.S. Cl. .................................. 242/7.11; 57/294
[58] Field of Search ................... 57/3, 293, 294; 242/47.01, 25 R, 7.11, 7.01

[56] References Cited

U.S. PATENT DOCUMENTS

| | | | |
|---|---|---|---|
| 428,873 | 5/1890 | Adams | 242/7.01 |
| 3,997,122 | 12/1976 | Helfand et al. | 242/1 |
| 4,317,329 | 3/1982 | Roberge | 57/294 |
| 4,448,015 | 5/1984 | Usui | 57/3 |

FOREIGN PATENT DOCUMENTS

| | | |
|---|---|---|
| 0068028 | 1/1983 | European Pat. Off. |
| 0369237 | 5/1990 | European Pat. Off. |
| 1665295 | 1/1967 | Fed. Rep. of Germany |
| 2053957 | 4/1972 | Fed. Rep. of Germany |
| 2656643C2 | 6/1977 | Fed. Rep. of Germany |
| 2826588 | 3/1979 | Fed. Rep. of Germany ........ 57/294 |
| 2656643 | 10/1985 | Fed. Rep. of Germany |
| 2915840 | 9/1990 | Fed. Rep. of Germany |
| 1285964 | 1/1961 | France |
| 1312136 | 12/1961 | France |
| 1285954 | 1/1962 | France ............................. 242/7.01 |
| 2111501 | 6/1972 | France |

OTHER PUBLICATIONS

Japan Patent Abstract for Kokai No. 53–4801.

*Primary Examiner*—Katherine Matecki
*Attorney, Agent, or Firm*—Kenyon & Kenyon

[57] ABSTRACT

A winding device for multiple wire wrapping a stationary object supplies the wires in a twist-free manner to a flyer that rotates around the stationary object. The wires are wound around the object by means of this flyer. Furthermore, one auxiliary arm is coupled to the flyer, which arm rotates synchronously with the flyer and which is provided with a guide device which guides the wires. A wire wrapping that changes winding directions is rendered possible in that at least one intermediate drum is provided, which is rotatably supported coaxially to the axis of rotation of the auxiliary arm and by way of which the wires are supplied from a stationary magazine to the guide device, whereby under the effect of force, the wires are able to be axially shifted on the intermediate drum from a winding point to an unwinding point. The circumference of the intermediate drum is smaller at the point where the wire unwinds than the wire length wound onto the object during a rotation of the flyer. The intermediate drum turns independent of the rotational direction of the auxiliary arms. This ensures that no greater length than what is needed is unwound from the intermediate drum.

20 Claims, 1 Drawing Sheet

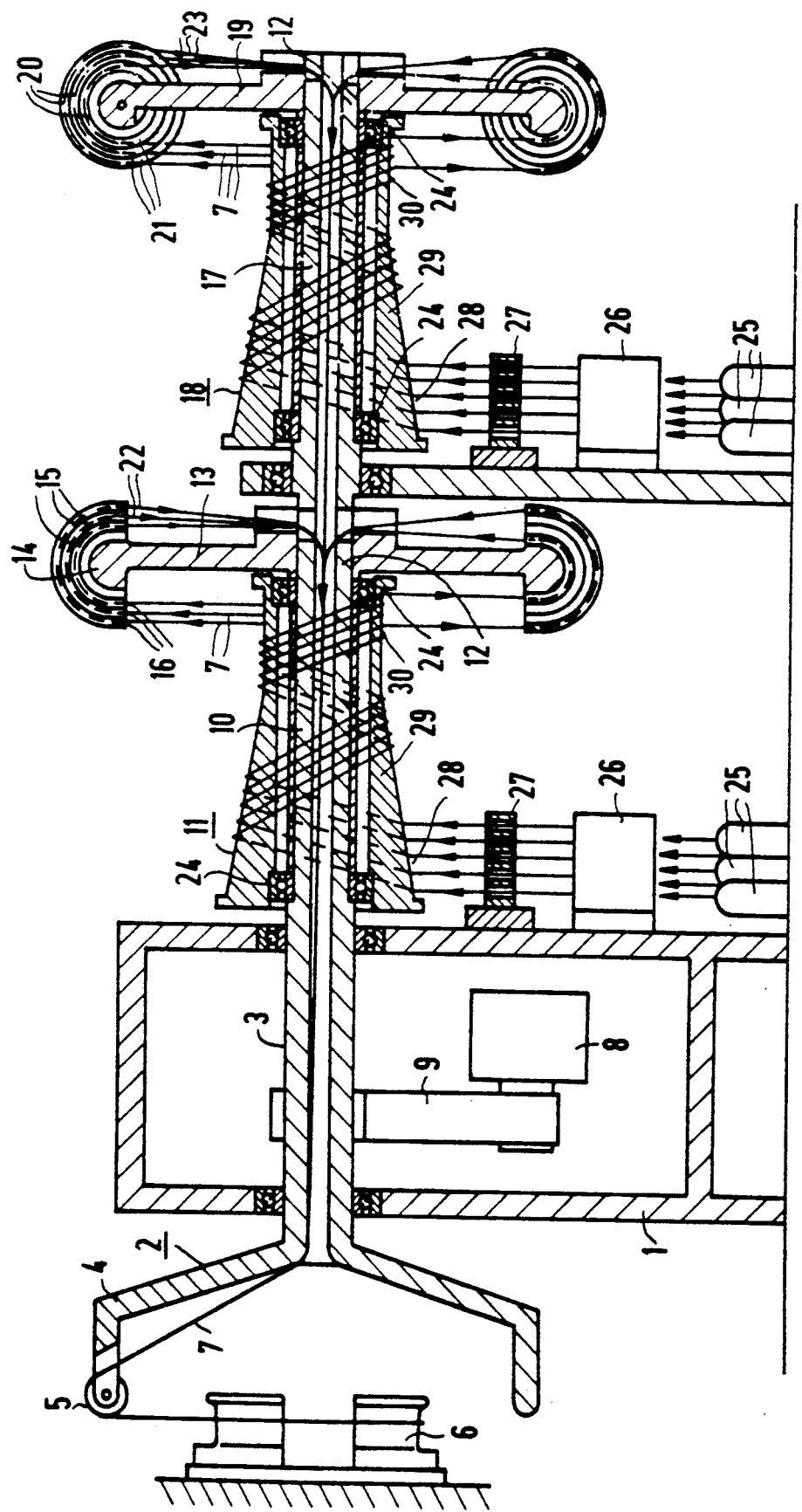

WINDING DEVICE FOR MULTIPLE-WIRE WRAPPING AN OBJECT

CROSS REFERENCE TO RELATED APPLICATIONS

The present application is a continuation-in-part application of U.S. patent application Ser. No. 07/790,261 filed by Herbert Stralka on Nov. 8, 1991 and now abandoned.

BACKGROUND OF THE INVENTION

The present invention relates generally to winding devices for multiple-wire wrapping an object, and more particularly to a winding device in which the wires are supplied in a twist-free manner to a flyer that rotates around the stationary object and are wound around the object by means of this flyer. Furthermore, at least one auxiliary arm is coupled to the flyer, which arm rotates synchronously with the flyer and which is provided with a guide device which guides the wires.

German Patent 29 15 840 discloses a winding device in which several rotatably configured wire magazines are provided to prevent the wires from twisting together. An auxiliary arm, which is coupled to the flyer, rotates around these wire magazines and draws the wires off from the wire magazines. Each of the wire magazines are set into rotary motion. Due to the relatively large mass of these wire magazines, correspondingly large accelerative forces are required. These forces have to be transferred from the wires to the wire magazines. With this type of device, wire wrapping in the opposite winding directions is difficult. Due to the varying rotational speed of the wire magazines, which is conditional upon the different winding directions, appropriate precautions must be taken to decelerate the magazines from high to low rotational speeds.

FR-A-2 111 501 and corresponding DE-A-20 53 957 disclose a device for braiding stranded goods with a tape or thread-like material. Provided in this device is a free-running, rotating storage which temporarily takes up the tape or thread-like material. From this storage, the material is pulled off by a spinner which rotates in alternate directions and is wound onto the stranded goods. In one winding direction of the spinner, the storage is moved by the tape or thread-like material and consequently the material is wound onto the storage. When the spinner rotates in the other direction, the material wound onto the storage is unwound again. Since the hereby unwound length of the material is greater than the length simultaneously wound onto the stranded goods, an additional storage must be provided, which takes up the difference in the length of the material.

The present invention is directed to the problem of developing a winding device for multiple wire wrapping of objects that enables wire to be wrapped in opposite winding directions, while keeping the forces acting on the wires as low as possible, even during a change in winding direction, without an additional storage.

SUMMARY OF THE INVENTION

The present invention solves this problem by providing at least one intermediate drum, which is rotatably supported coaxially to the axis of rotation of the auxiliary arm and by way of which the wires are supplied from a stationary magazine to the guide device, whereby under the effect of force, the wires are able to be axially shifted on the intermediate drum from the winding point to the unwinding point.

With the help of the intermediate drum, a sufficient number of turns per unit length of wire can be made available for the particular winding direction. During the time that one winding direction prevails, in which the direction of rotation of the auxiliary arm conforms with the direction of rotation of the intermediate drum which always rotates in the same direction, the intermediate drum is accelerated more vigorously by the pull of the wire. As a result, more wire windings are coiled around the intermediate drum than are pulled off from this drum. In the opposite winding direction, the auxiliary arm and the intermediate drum turn in opposite directions. Thus as a result of the action of the auxiliary arm, more wire windings are pulled off from the intermediate drum than are wound around it at the same time. Therefore, the amount of wire present on the intermediate drum vacillates between an upper and a lower value. The dimensions of the intermediate drum itself can be kept relatively small, so that no large mass acceleration forces are required when the wire is pulled off. When changing from high to low rotational speeds, the intermediate drum can be decelerated by means of the wire brake which already exists in the feeding path of the wires.

An automatic axial shifting of the wires on the intermediate drum under the influence of the pull of the wire is achieved by providing a drum hub for the intermediate drum. The periphery of the drum hub exhibits a tapered profile, and the wires in the area of the larger hub diameter are wound from the magazine on to the intermediate drum and, in the area of the smaller diameter, are pulled off by means of the auxiliary arm.

As a result of the axially staggered configuration of the feed points for the individual wires on the guide device of the auxiliary arm, the wires are pulled off exactly radially from the intermediate drum in accordance with the side-by-side wire positions. If the guide points consist of rotatably supported guide rollers, then the axially staggered configuration of the feed points of the wires leading into the guide device is achieved by appropriately staggering the diameter of the individual guide rollers. By uniformly distributing two or more auxiliary arms over 360°, one can avoid out-of-balance conditions. The winding points can also be distributed accordingly.

One is able to attain a structurally compact design with a winding device by providing that the intermediate drum is rotatably supported on an extension piece of the torque shaft of the flyer, and the auxiliary arm is connected so that it is torsionally fixed to the end of the extension piece that is brought out axially over the intermediate drum.

It is possible to avoid costly constructive alterations to the basic design of a winding device by arranging the intermediate drum so that it is rotatable on a separate shaft part, which is coupled by its one end to the torque shaft of the flyer, and the auxiliary arm is rigidly connected to the other end of the shaft part. This specific embodiment, which is designed according to modular construction principles, is particularly suited for modifying an existing winding device. In addition, several shaft parts can be arranged one behind the other and be connected to the torque shaft of the flyer.

BRIEF DESCRIPTION OF THE DRAWING

The sole DRAWING depicts an embodiment of the present invention.

DETAILED DESCRIPTION

The housing 1 of a winding device supports a flyer 2 with a hollow torque shaft 3. A wire guide roller 5 is rotatably supported at the unattached end one of the flyer arms 4. Wires 7 are fed to this wire guide roller 5 by means of the hollow torque shaft 3. The wires 7 to be wound on a stationary winding form 6 are guided accordingly through the wire guide roller 5 when the winding form 6 is wire wrapped. The flyer 2 is actuated by means of a driving motor 8, which is installed in the housing 1. This driving motor 8 is coupled via a belt drive 9 to the torque shaft 3.

In the depicted exemplified embodiment, the torque shaft 3 of the flyer 2 on the housing side situated opposite the flyer 2 is extended beyond the housing. An intermediate drum 11 is freely rotatably supported on a first extension piece 10 of the torque shaft 3 by means of two rolling contact bearings 24 opposite the torque shaft 3. Two auxiliary arms 13 are arranged on one part 12 of the first extension piece 10, which projects axially over the intermediate drum 11, which arms extend radially to the outside so that the arms are torsionally fixed with respect to the extension piece 10. The auxiliary arms 13 mutually oppose each other, so that out-of-balance conditions are avoided to the greatest extent possible. More auxiliary arms 13 can be provided, e.g. three, so that they are uniformly distributed over 360°. A guide device consisting of several circular guide paths 15 is arranged on the radially outermost, unattached end 14 of each auxiliary arm 13. The individual guide paths 15 are designed with different sized diameters, so that an axially staggered configuration of the feed points 16 for the wires 7 results in the guide direction. Consequently, the axial position of the feed points 16 corresponds to the axial position of each wire 7 on the intermediate drum 11, so that the wires 7 can be pulled off exactly radially from the intermediate drum 11.

If a large number of wires 7 needs to be wound simultaneously, then it is useful to lengthen the torque shaft 3 with a second extension piece 17 and to configure another intermediate drum 18 and additional auxiliary arms 19 on this extension piece 17. Thus, the number of wires 7 guided over each intermediate drum 11 or 18 and each auxiliary arm 13 or 19 can be selected in a way that ensures that the wires 7 will not cross over on the intermediate drums 11 and 18.

Another specific embodiment of the guide device is provided on the additional auxiliary arms 19. In this case, the wires 7 are guided by guide rollers 20 which are rotatably supported on the auxiliary arm 19. With regard to their diameter, the individual guide rollers 20 are graduated in a way that results again in an axially staggered configuration of the feed points 21. This configuration guarantees that the individual wires 7 are pulled off exactly radially from the additional intermediate drum.

The wires 7 are guided from the exit side 22 or 23 of the guide paths 15 and of the guide rollers 20, respectively, into the hollow space of the torque shaft 3 and as already mentioned, from there, attain the wire guide roller 5. The wires 7 are fed to the specific intermediate drum 11 or 18 from stationary wire buckets 25. The wires 7 run thereby across a wire brake 26 and through intake nozzles 27. By way of the intake nozzles 27, the wires 7 reach the winding point 28 on the intermediate drum 11 or 18. The hub 29 of the intermediate drum 11 or 18 exhibits a tapered profile which slopes off from the winding point 28 toward the unwinding point 30 situated radially below the feeding points 16 and 21 of the guide paths 15 and of the guide rollers 20, respectively. The wires 7 shift axially from the winding point 28 toward the unwinding point 30 as a result of this tapered profile and because of the tensile force acting on the wires 7. Since the tensile force causes the wires 7 to abut closely against the hub 29 of the drum, the wires 7 do not cross over.

Apart from that, it is assured at the unwinding point by the corresponding dimensions of the intermediate drum 11, that the intermediate drum 11 turns independent of the turning direction of the respective auxiliary arm 13 and/or 19, always in the same direction. Thus, by the auxiliary arm 13 and/or 19 no greater wire length than the one actually needed can be unwound from the intermediate drum 11.

Because the wires 7 are guided by way of the auxiliary arms 13 and 19 which rotate synchronously with the flyer 2, the wires are prevented from twisting together, since the mutual position of the wires 7 always remains the same. The intermediate drum 11 or 18 guarantees the feeding of the wire even when the winding directions of the flyer 2 changes.

What is claimed is:

1. A winding device for wrapping wires around a stationary object, comprising:
   a) a flyer;
   b) a drive mechanism coupled to the flyer for rotating the flyer;
   c) an auxiliary arm having an axis of rotation, being coupled to the flyer and rotating synchronously with said flyer;
   d) a stationary magazine containing the wires;
   e) a guide device for guiding the wires on the auxiliary arm and from the auxiliary arm to the flyer, the rotation of the flyer applying a tensile force on the wires; and
   f) an intermediate drum having a circumference, being rotatably supported coaxially to the axis of rotation of the auxiliary arm and supplying the wires from said stationary magazine to said guide device in a twist free manner, so that the tensile force on the wires caused by the rotation of the flyer cause the wires to be axially shifted on said intermediate drum from a winding point to an unwinding point, the winding point being a location on the intermediate drum where the wires engage the intermediate drum from the stationary magazine before axial shifting, and the unwinding point being a location on the intermediate drum, axially spaced from the winding point and where the wires, after axial shifting due to the tensile force, disengage from the intermediate drum for supply to the guide device, wherein said flyer rotates around the object and the wires are wound around the object, and the circumference of the intermediate drum is smaller at the unwinding point than the wire length wound onto the object during a rotation of the flyer.

2. The device according to claim 1, wherein said intermediate drum includes a drum hub having a periphery with a tapered profile, an area of a larger hub diameter at the winding point and an area of a smaller hub diameter at the unwinding point, and the wires in the area of a larger hub diameter are wound from said stationary magazine on to said intermediate drum and, in the area of a smaller diameter, the wires are pulled off the intermediate drum by means of said auxiliary arm.

3. The device according to claim 2, wherein said guide device includes a guide area for each wire, each guide area having a feeding point, the feeding point being a location of the respective guide area where the respective wire is received into the respective guide area from the intermediate drum, the feeding points being spaced from one another.

4. The device according to claim 3, wherein said guide areas each comprise a circular guide path, the circular guide paths having graduated diameters relative to each other.

5. The device according to claim 4, further comprising a plurality of auxiliary arms, each auxiliary arm being coupled to the flyer, having an axis of rotation and rotating synchronously with said flyer, the auxiliary arms further being evenly spaced from one another in a circumferential direction through an arc of 360°.

6. The device according to claim 4, wherein said flyer comprises a torque shaft having an extension piece on which said intermediate drum is rotatably supported, said extension piece having an end that protrudes axially beyond the intermediate drum, the auxiliary arm being mounted on the protruding end for synchronous rotation with the flyer.

7. The device according claim 6, further comprising a separate shaft part having a first and second end, said intermediate drum being rotatable upon said separate shaft part, said separate shaft part being coupled by said first end to said torque shaft and said auxiliary arm being rigidly connected to said second end of said separate shaft part.

8. The device according to claim 2, further comprising a plurality of auxiliary arms, each auxiliary arm being coupled to the flyer, having an axis of rotation and rotating synchronously with said flyer, the auxiliary arms further being evenly spaced from one another in a circumferential direction through an arc of 360°.

9. The device according to claim 2, wherein said flyer comprises a torque shaft having an extension piece on which said intermediate drum is rotatably supported, said extension piece having an end that protrudes axially beyond the intermediate drum, the auxiliary arm being mounted on the protruding end for synchronous rotation with the flyer.

10. The device according claim 9, further comprising a separate shaft part having a first and second end, said intermediate drum being rotatable upon said separate shaft part, said separate shaft part being coupled by said first end to said torque shaft and said auxiliary arm being rigidly connected to said second end of said separate shaft part.

11. The device according to claim 1, wherein said guide device includes a guide area for each wire, each guide area having a feeding point, the feeding point being a location of the respective guide area where the respective wire is received into the respective guide area from the intermediate drum, the feeding points being spaced from one another.

12. The device according to claim 11, wherein said guide areas each comprise a circular guide path, the circular guide paths having graduated diameters relative to each other.

13. The device according to claim 12, further comprising a plurality of auxiliary arms, each auxiliary arm being coupled to the flyer, having an axis of rotation and rotating synchronously with said flyer, the auxiliary arms further being evenly spaced from one another in a circumferential direction through an arc of 360°.

14. The device according to claim 12, wherein said flyer comprises a torque shaft having an extension piece on which said intermediate drum is rotatably supported, said extension piece having an end that protrudes axially beyond the intermediate drum, the auxiliary arm being mounted on the protruding end for synchronous rotation with the flyer.

15. The device according claim 14, further comprising a separate shaft part having a first and second end, said intermediate drum being rotatable upon said separate shaft part, said separate shaft part being coupled by said first end to said torque shaft and said auxiliary arm being rigidly connected to said second end of said separate shaft part.

16. The device according to claim 11, further comprising a plurality of auxiliary arms, each auxiliary arm being coupled to the flyer, having an axis of rotation and rotating synchronously with said flyer, the auxiliary arms further being evenly spaced from one another in a circumferential direction through an arc of 360°.

17. The device according to claim 11, wherein said flyer comprises a torque shaft having an extension piece on which said intermediate drum is rotatably supported, said extension piece having an end that protrudes axially beyond the intermediate drum, the auxiliary arm being mounted on the protruding end for synchronous rotation with the flyer.

18. The device according claim 17, further comprising a separate shaft part having a first and second end, said intermediate drum being rotatable upon said separate shaft part, said separate shaft part being coupled by said first end to said torque shaft and said auxiliary arm being rigidly connected to said second end of said separate shaft part.

19. The device according to claim 1, further comprising a plurality of auxiliary arms, each auxiliary arm being coupled to the flyer, having an axis of rotation and rotating synchronously with said flyer, the auxiliary arms further being evenly spaced from one another in a circumferential direction through an arc of 360°.

20. The device according to claim 1, wherein said flyer comprises a torque shaft having an extension piece on which said intermediate drum is rotatably supported, said extension piece having an end that protrudes axially beyond the intermediate drum, the auxiliary arm being mounted on the protruding end for synchronous rotation with the flyer.

* * * * *